(12) United States Patent
Vogt

(10) Patent No.: US 6,435,738 B1
(45) Date of Patent: Aug. 20, 2002

(54) DEVICE FOR ADJUSTING AN OPTICAL APPARATUS

(75) Inventor: Philippe Vogt, Zürich (CH)

(73) Assignee: AFCA-SWISS International S.A.R.L., Besancon (FR)

( * ) Notice: Subject to any disclaimer, the term of this patent is extended or adjusted under 35 U.S.C. 154(b) by 0 days.

(21) Appl. No.: 09/420,289

(22) Filed: Oct. 18, 1999

(51) Int. Cl.[7] .............................................. G03B 17/00
(52) U.S. Cl. ...................................... 396/419; 396/428
(58) Field of Search ................................ 396/419, 428

(56) References Cited

U.S. PATENT DOCUMENTS

| | | | | |
|---|---|---|---|---|
| 2,824,504 A | * | 2/1958 | Bethmann ................... | 396/419 |
| 5,230,490 A | * | 7/1993 | Sloop ......................... | 396/419 |
| 5,737,657 A | * | 4/1998 | Paddock et al. ............ | 396/428 |

* cited by examiner

*Primary Examiner*—David M. Gray
(74) *Attorney, Agent, or Firm*—Sidley Austin Brown & Wood, LLP

(57) ABSTRACT

The apparatus has a first and a second member (5,6) and a device (7) for the fixing of a guide rail (1) with an optical apparatus to the members. The device (7) contains a blocking member (8) and a lever (9) with a holding device (10) standing under spring action, the lever being pivotally mounted on the blocking member and contacting the second member (6) in such a way that the lever fixes the optical apparatus in a first position, frees the optical apparatus for displacement in a second position and releases the optical apparatus for removal in a third position.

3 Claims, 2 Drawing Sheets

DEVICE FOR ADJUSTING AN OPTICAL APPARATUS

The invention relates to an apparatus for the fixation of an optical apparatus in accordance with the preamble of the claim 1.

The known apparatuses of this kind have a first member and a second member which are adjustable relative to one another and can be brought into and out of engagement with a guide rail and a means for the fixing of the members to the guide rail, the means comprising a bolt with a threaded section and a knurled knob. The bolt is secured in the first member and penetrates the second member so that the threaded section lies exposed outside of the second member in order to screw on the knurled knob.

The disadvantages of the apparatus are to be seen essentially in that a certain amount of care is necessary when releasing the knurled knob for the purpose of displacement of the optical apparatus and in that a security against unintentional release for the removal of the optical apparatus is not provided.

The invention is based on the object of improving a device for the fixation of an optical apparatus.

This object is satisfied in accordance with the invention with the features of the claim 1.

The advantages of the invention are essentially to be seen in the simple handling of the apparatus and in the safety of the apparatus against faulty operation.

Advantageous embodiments of the apparatus result from the dependent claims.

Figure 1:
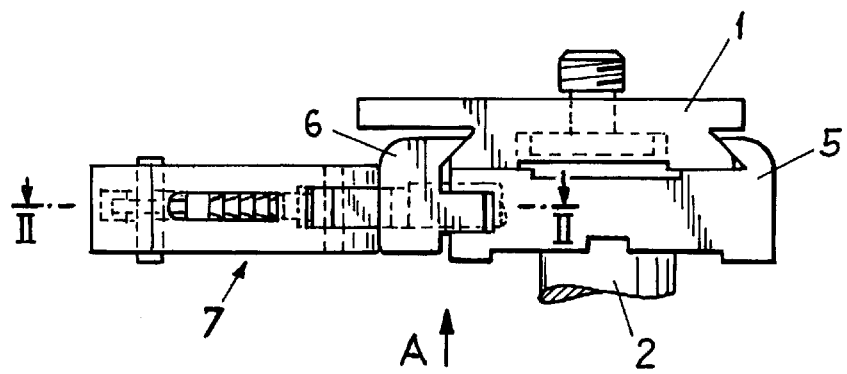
Figure 2:
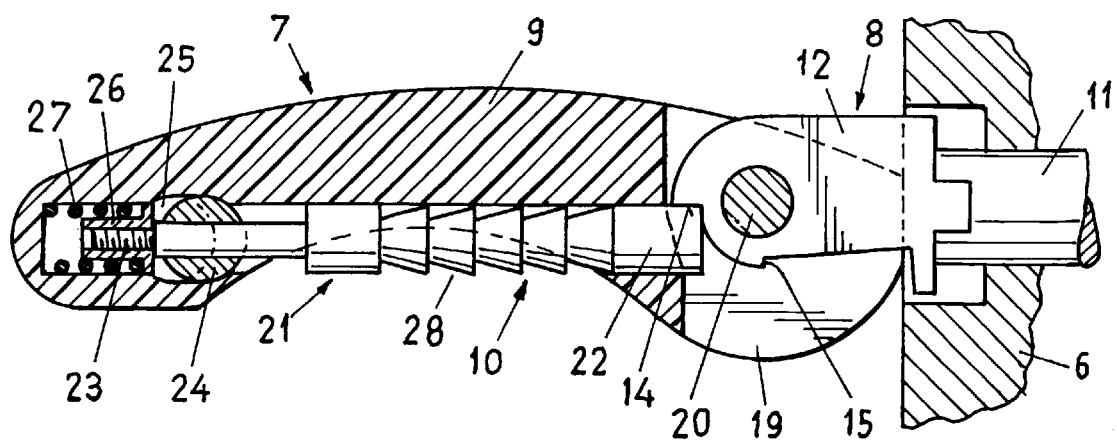

The invention will be explained in the following with reference to the accompanying drawings. There are shown:

FIG. 1 a side view of an embodiment of an apparatus in accordance with the invention;

FIG. 2 a section along the line II—II in FIG. 1 to an enlarged scale.

Figure 6:
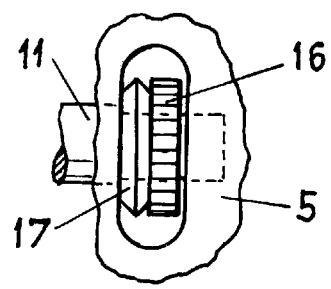
Figure 3:
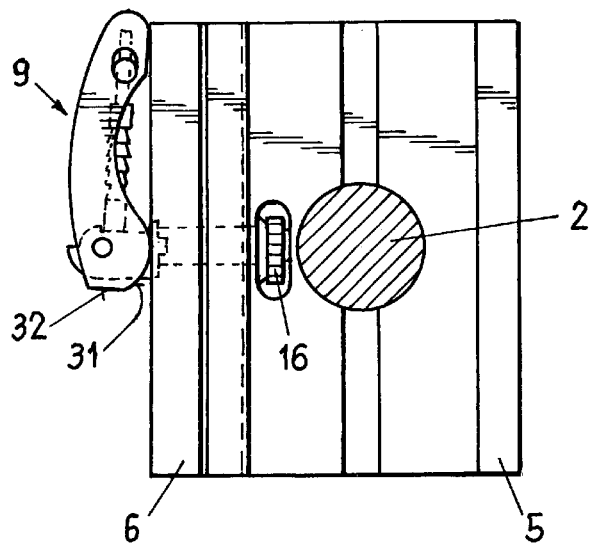
Figure 4:
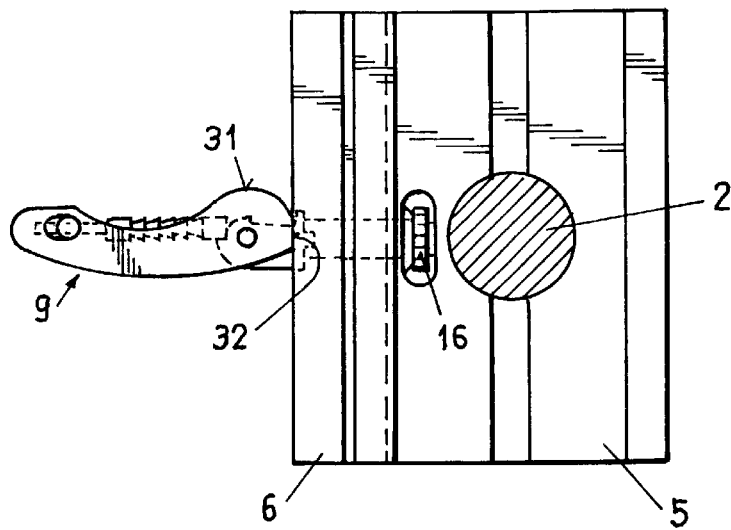
Figure 5:
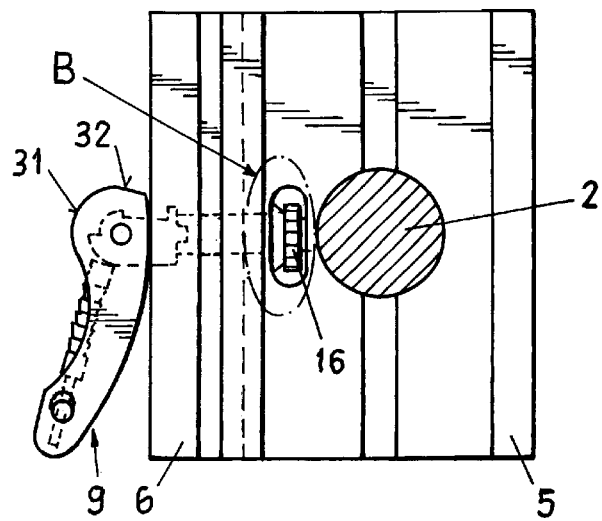

FIG. 3 a view of the apparatus of FIG. 1 in the direction of the arrow A which shows the position of the lever when the optical apparatus is fixed;

FIG. 4 a view of the apparatus in accordance with FIG. 1 in the direction of the arrow A which shows the position of the lever for the displacement of the optical apparatus;

FIG. 5 a view of the apparatus of FIG. 1 in the direction of the arrow A which shows the position of the lever for the release of the optical apparatus, and FIG. 6 a detail B in FIG. 5.

Reference is made to the FIGS. 1 and 2. With the device under discussion here, an optical apparatus with a guide rail 1 is fixed onto a carrier part 2 which can be secured on a stand or the like. As the FIGS. show the apparatus contains a first member 5, a second member 6 and a device 7 with a blocking member 8, a lever 9 and a holding device 10. The first and second members 5, 6 have sections with guide surfaces which are complementary to the guide surfaces of the guide rail 1, so that the guide rail with the optical apparatus is reliably held when the guide surfaces are pressed against one another. The blocking member 8 comprises a bolt 11 which is connected to the first member 5 and passes through the second member 6 and a head 12 with a rectangular cross-section and a contour which has a higher first shoulder 14 and a lower second shoulder 15. The blocking member 8 is connected by means of a knurled nut 16 and a spring element 17 to the first member 5 (FIG. 6).

The lever 9 comprises a body with a cut-out 19 and an axle 20, so that the lever is rotatably mounted on the head 12 and the lever can be pivoted. The holding device 10 contains a blocking pin 21 having a cylindrical section 22 at one end, the cylindrical section 22 being guided in a bore in the body, with its end face contacting the contour of the head 12, and having a threaded section 23 at the other end, which projects into a blind bore provided in the body, an actuating member 24 which is secured to the blocking pin and lies in a cut-out 25 formed in the body, a support part 26 which is screwed onto the threaded section 23 and a compression spring 27 which is arranged in the blind bore and is braced at one end at the base of the blind bore and at the other end on the support part 26 in order to bias the blocking pin 21 against the contour of the head. The blocking pin 21 is provided with a section 28 in order to shift the blocking pin against the compression spring and to lift the blocking pin from the contour of the head 12.

Reference is made to the FIGS. 3 to 5. As the FIGS. 3 and 4 show the lever 9 has a contour at the end contacting the second member 6 having an arcuate section 31 in order to shift the second member 6 standing under spring action forwardly or backwardly with respect to the first member 5 and a planar section 32 in order to free the guide rail 1 for the displacement. As FIG. 5 shows the rear side of the lever 9 contacts the second member 6 in order to free t he guide rail 1 for the removal.

In the following the operation of the apparatus will be described, starting from the illustration of FIG. 3. In FIG. 3 the lever adopts a first position in which the guide rail 1 is fixed to the optical apparatus. In this position the lever 9 with the arcuate section 31 has pressed the members 5, 6 against the guide rail 1 and the blocking pin 21 lies with the cylindrical section 22 on the low shoulder 15 of the blocking member 12. In order to free the guide rail 1 for the displacement the lever 9 is pivoted in the counterclockwise sense into a second position. Through this pivotal movement, the blocking pin 21 is lifted from the low shoulder 15, with the second member 6, which stands under spring action, following the contour of the arcuate section. In order to free the optical apparatus 1 for removal, the lever 9 is pivoted in the counterclockwise sense into a third position. This pivotal movement can only be executed when the cylindrical section 22 has previously been released by manual retraction of the blocking pin 21 from the higher shoulder 14. The advantage of the apparatus of preventing an unintended release for the removal of the optical apparatus is particularly clear from the present description.

What is claimed is:

1. Apparatus for the fixing of an optical apparatus having a guide rail (1) to a carrier part (2) comprising a first member (5) which is connected to the carrier part (2) and a second member (6) which is adjustable relative to the first member and with a device (7) for the fixing of the guide rail (1) which is connected to the first member and passes through the second member, characterised in that the device (7) has a blocking member (8) and a lever (9) with a holding device (10) standing under spring action, the lever being pivotally mounted on the blocking member and contacting the second member (6) in such a way that the lever fixes the optical apparatus in a first position, frees the optical apparatus for displacement in a second position and frees the optical apparatus for removal in a third position, and in that the blocking member (8) has a first shoulder (14) and a second shoulder, (15) and the blocking pin (21) is movably arranged in the lever (9).

2. Apparatus in accordance with claim 1, characterised in that the holding device (10) contains a blocking pin (21) standing under spring action which can be brought into and out of engagement with the blocking member (8) and an actuating member (24) which is connected to the blocking pin in order to release the blocking pin from the blocking member.

3. Apparatus in accordance with claim 1 or claim 2, characterised in that the blocking pin (21) has a section (28) for the actuation of the blocking pin which is partly freely accessible.

* * * * *